Figure 1:
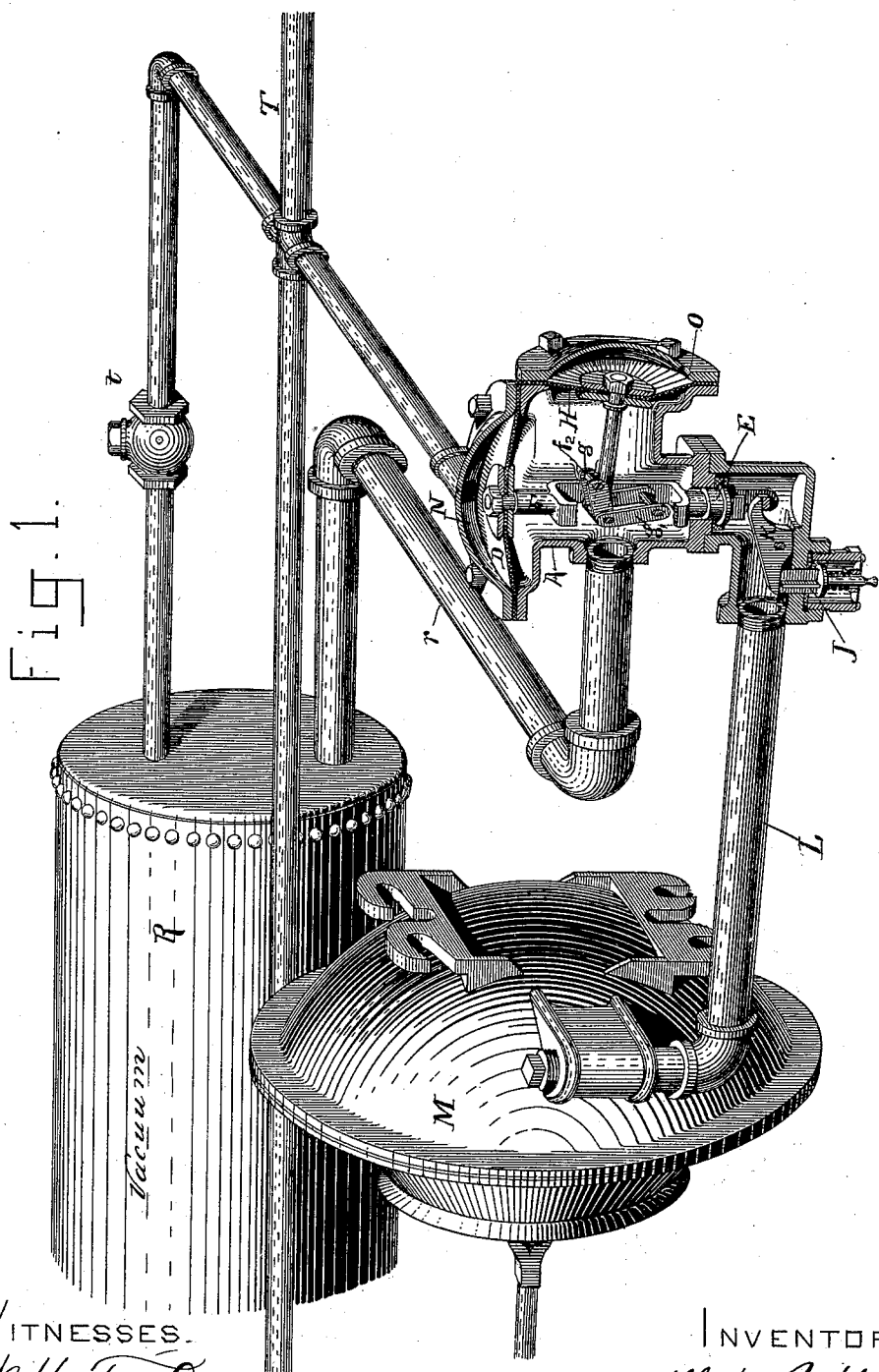

(No Model.) 2 Sheets—Sheet 1.

A. P. MASSEY.
AUTOMATIC CAR BRAKE.

No. 351,786. Patented Nov. 2, 1886.

Witnesses.
W. H. Ford
A. K. Sauger

Inventor.
Albert P. Massey (No Model.) 2 Sheets—Sheet 2.
A. P. MASSEY.
AUTOMATIC CAR BRAKE.
No. 351,786. Patented Nov. 2, 1886.
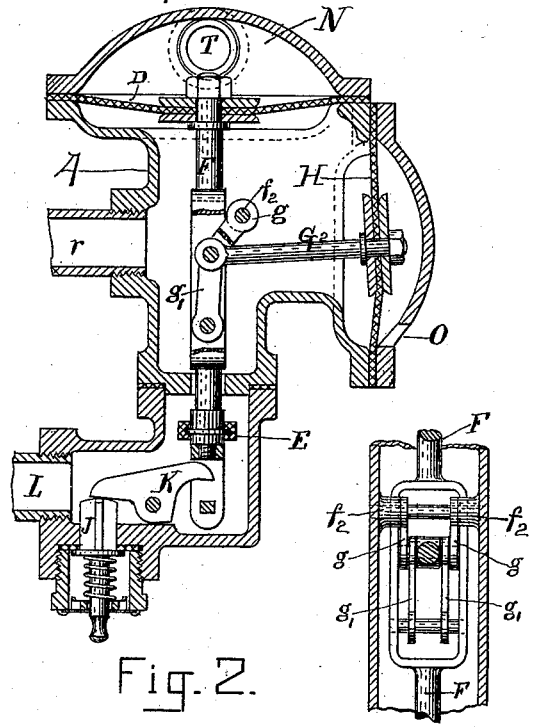
Fig. 2.
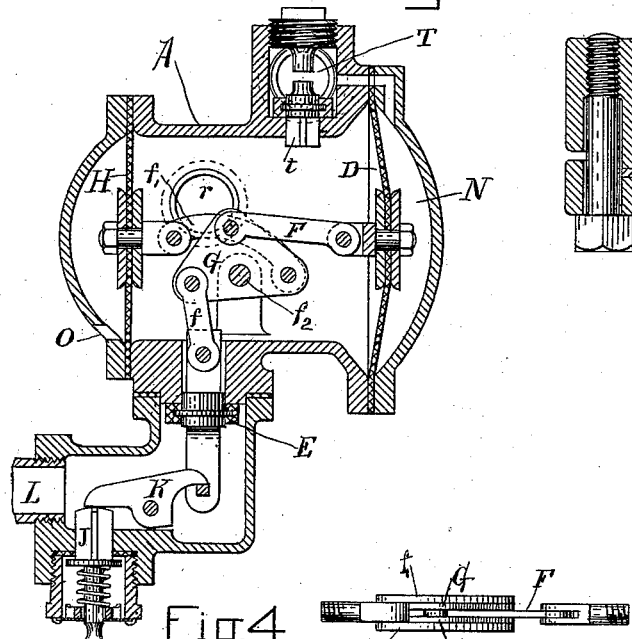
Fig. 4.
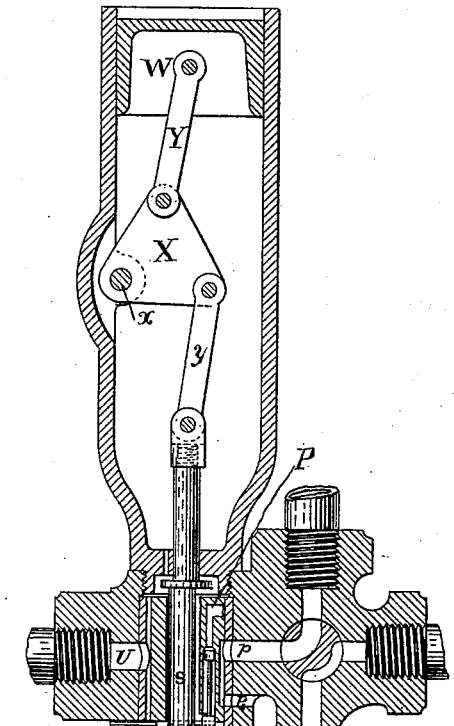
Fig. 3.
Fig. 6.
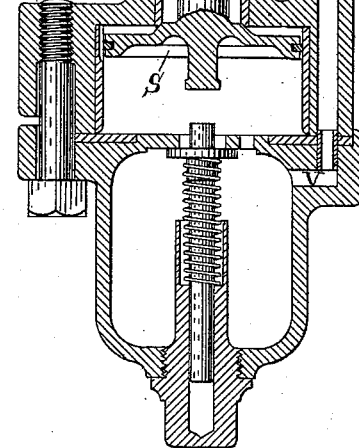
Fig. 5.
WITNESSES,
W. H. Ford.
A. K. Sanger
INVENTOR,
Albert P. Massey

UNITED STATES PATENT OFFICE.

ALBERT P. MASSEY, OF WATERTOWN, NEW YORK, ASSIGNOR TO THE EAMES VACUUM BRAKE COMPANY, OF SAME PLACE.

AUTOMATIC CAR-BRAKE.

SPECIFICATION forming part of Letters Patent No. 351,786, dated November 2, 1886.

Application filed June 21, 1886. Serial No. 205,772. (No model.)

*To all whom it may concern:*

Be it known that I, ALBERT P. MASSEY, a citizen of the United States, residing at Watertown, in the county of Jefferson and State of New York, have invented certain new and useful Improvements in Automatic Car-Brakes; and I do hereby declare that the following is a full, clear, and exact description of the invention, which will enable others skilled in the art to which it appertains to make and use the same.

My invention relates to the valves that regulate the distribution of fluid-pressure between a reservoir and a diaphragm or cylinder for actuating brakes.

I am aware that various devices have been made for operating the valves between a reservoir and a brake cylinder or diaphragm automatically, and that some have attempted to hold the valve midway of its stroke by springs or by varying the area of the diaphragm. My device is not like these, but consists in opposing two diaphragms or pistons to one another by means of an intermediate lever or bell-crank in such a manner that as the position varies from one extreme of the stroke to the other the effective leverage of one diaphragm or piston to move the valve is constantly decreasing, while the effective leverage of the other is constantly increasing. In this way, by varying the pressure in the train-pipe more or less, the valve can be moved to any part of its stroke and held there.

Figure 1 is a perspective view of the apparatus as applied to a car for operating the brakes by producing a vacuum in the brake-diaphragm. The valve is shown in section. Fig. 2 is a cross-section of the same. Fig. 3 is a section showing the lever and fulcrum. Figs. 4 and 5 show a modification of the same device. Fig. 6 shows the device applied to a valve for actuating the brake by air-pressure.

In Figs. 1, 2, and 4, A is a shell inclosing the apparatus and connected with the reservoir R by pipe $r$.

R is a reservoir, in which is maintained a vacuum by means of an ejector or pump through the train-pipe T and the check-valve $t$.

T is a pipe running through the train, in which a vacuum is produced by an ejector or pump.

$t$ is a check-valve, which allows the air to pass from the reservoir to the pipe T, but checks any flow into the reservoir.

D is a flexible diaphragm, exposed on its inner side to the vacuum in the reservoir, and on its outer side to the vacuum in the train-pipe.

E is a valve for regulating the flow of air from the brake diaphragm or cylinder to the reservoir.

F is a stem connecting valve E with diaphragm D directly in Figs. 1 and 2, and through bell-crank G and connecting-rod $f$ in Fig. 4.

H is a diaphragm for modifying the action of diaphragm D, and is connected with it and the valve by connecting-rod $f'$ and bell-crank G, Fig. 4, or link $G^2$, lever $g$, and link $g'$, Figs. 1 and 2.

$f^2$ is a fixed fulcrum.

J is a valve for admitting air and releasing the brake.

K is a lever connecting the release-valve with the valve E.

L is a pipe communicating with the diaphragm M, to which the brake-levers are attached.

O is an opening allowing the atmosphere to act upon the outside of diaphragm H.

N is a closed chamber connected with train-pipe T.

Fig. 6 shows a valve in ordinary use for air-pressure brakes, as modified by this device, in which P is a slide-valve moving over port $p$ and $p'$. $p$ is a port leading to brake-cylinder. $p'$ is a port leading to open air. S is a piston connected to slide-valve by stem $s$. U is a port connecting inside of valve-case above the piston S with the storage-reservoir. V is a port connecting inside of valve-case below the piston S with the train-pipe. W is a piston for modifying the action of piston S. X is a bell-crank attached to a fixed fulcrum, $x$.

Y is a link connecting piston W with bell-crank X. $y$ is a link connecting stem $s$ of piston S with bell-crank X.

The action of the device is essentially the same whether diaphragms or pistons are used to actuate the valves, and whether the brakes are applied by producing a vacuum or by air-pressure, only the valves need to open in reverse ways in the two cases.

The operation is as follows: The reservoir R, Fig. 1, is charged with fluid-pressure either above or below the atmospheric pressure by means of a pump or ejector through the train-pipe T and check-valve $t$. This train-pipe is also connected with the chamber N without any valve, so that the pressure in the train-pipe and the chamber N is always alike. The chamber A is open to the reservoir R through pipe $r$. When the pressure in the train-pipe and in the reservoir is equal, the diaphragm D will be in equilibrium and have no tendency to move the valve E.

As a vacuum-brake, when the vacuum is the same in the train-pipe and in the reservoir, the diaphragm D will be in equilibrium; but if the vacuum in the train-pipe T be partially destroyed the increase of pressure on the outside of the diaphragm D will press it in and open the valve E. If, now, the vacuum in the train-pipe be restored, the diaphragm D will rise and close the valve. If the apparatus consisted simply of the diaphragm D and the valve E, arranged as described, the diaphragm would move its whole limit whenever the pressure varied enough to make it move at all, and the brakes would be applied with full force or would be all off. To enable the valve to be moved slowly and held in any desired position, the diaphragm H is added. This diaphragm is exposed to the fluid-pressure of the reservoir on one side and to the atmosphere on the other. It is connected with the main diaphragm D by means of link $G^2$, lever $g$, and link $g'$, Figs. 1 and 2, (or by link F, bell-crank G, and link $f$, Fig. 4,) at such an angle that it offers a constantly-increasing resistance to the movement of the diaphragm D and the valve E attached. The leverage of diaphragm D to revolve lever $g$, Figs. 1 and 2, or bell-crank G, Fig. 4, about fulcrum $f^2$ is constantly decreasing as the valve opens, while the leverage of diaphragm H through links $G^2$, to resist such motion about fulcrum $f^2$, is constantly increasing. For instance, when arranged, as shown, with the valve closed, the resistance to the movement of the valve is 0.12 of the vacuum in the reservoir. When the valve has moved one-fifth of its stroke, the resistance would be 0.25. When the valve has moved two-fifths of its stroke, the resistance would be 0.33. When the valve has moved three-fifths, the resistance would be 0.5. When the valve has moved four-fifths, the resistance would be 0.7. When the valve has moved its full stroke, the resistance would be 0.9 of the pressure in the reservoir. This enables the engineer to control the location of the valve at will by regulating the pressure in the train-pipe.

It is obvious that by changing the angle between the diaphragm and the lever $g$, Figs. 1 and 2, or by connecting the diaphragms or pistons to different points of the bell-crank G, Fig. 4, any varying resistance may be obtained that may be desired.

To show that this device may be applied to any kind of valve which is operated by varying pressure on different sides of a piston or diaphragm, I show it in Fig. 6 as attached to what is commonly known as the "triple valve"—a valve in general use with brakes when a pressure exceeding the atmosphere is used. In this device the valve P is moved over the ports $p$ and $p'$, for the purpose of applying or releasing the brakes by means of the piston S, which is exposed on the lower side to the pressure in the train-pipe through the port V, and on the upper side to the pressure in the reservoir through the port U. When these are in equilibrium, the valve remains up and the brakes are off. To apply the brakes the pressure in the train-pipe is reduced. The excess of pressure in the reservoir then moves the piston, and with it the valve P, so as to close the exhaust-port $p'$ and admit air from the reservoir to the brake-cylinder through port $p$. It is evident that when the difference in pressure is sufficient to start the piston and valve it will move it through its whole stroke. A spring could be adjusted to offer resistance to full stroke for any given pressure in the reservoir; but a slight variation of the pressure would vary the position of the valve so much as to make it inoperative. By the addition of a piston, W, exposed to the reservoir-pressure on one side and the atmospheric pressure on the other, and connected to the main piston by means of a bell-crank, X, or its equivalent, revolving on a fixed fulcrum, $x$, the resistance varies as the valve travels over its ports, and is always proportional to the pressure in the reservoir. As piston S moves down, the leverage of link $y$ to turn X about fulcrum $x$ is constantly decreasing, while the leverage of link Y, to resist the motion of X about fulcrum $x$, is constantly increasing. This variation can be adapted to suit any case by varying the length of the leverages or the angle between them, and when fixed to suit the travel of any valve it will work equally well for all pressures in the reservoir.

Having fully described my invention, what I desire to claim and secure by Letters Patent is—

1. In a car-brake operated by fluid-pressure, a valve actuated by two pistons or diaphragms connected to the valve at different angles, so that the effective leverage of one piston or diaphragm will decrease and the effective leverage of the other piston or diaphragm will increase as the valve approaches or recedes from its position when closed, substantially as set forth.

2. In a car-brake operated by fluid-pressure, the diaphragms D and H, in combination with the lever $g$ and the fulcrum $f^2$, for actuating a valve regulating the flow of air to or from a brake cylinder or diaphragm.

3. In a car-brake operated by fluid-pressure, the diaphragms D and H, in combination with bell-crank G and fulcrum $f^2$, actuating a valve regulating the flow of air to or from a brake cylinder or diaphragm.

In testimony whereof I, the said ALBERT P. MASSEY, have hereunto set my hand.

ALBERT P. MASSEY.

Witnesses:
A. H. SAWYER,
J. M. FAIRBANKS.